(12) United States Patent
Feng

(10) Patent No.: US 9,479,953 B2
(45) Date of Patent: Oct. 25, 2016

(54) METHOD AND APPARATUS FOR OBTAINING TERMINAL MINIMIZATION OF DRIVE-TESTS DATA

(71) Applicant: Huawei Technologies Co., Ltd., Shenzhen, Guangdong (CN)

(72) Inventor: Li Feng, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 127 days.

(21) Appl. No.: 14/506,185

(22) Filed: Oct. 3, 2014

(65) Prior Publication Data

US 2015/0023180 A1    Jan. 22, 2015

Related U.S. Application Data

(63) Continuation of application No. PCT/CN2013/072330, filed on Mar. 8, 2013.

(30) Foreign Application Priority Data

Apr. 5, 2012 (CN) .......................... 2012 1 0097632

(51) Int. Cl.
*H04W 24/08* (2009.01)
*H04W 8/24* (2009.01)
(Continued)

(52) U.S. Cl.
CPC .............. *H04W 24/08* (2013.01); *H04W 8/24* (2013.01); *H04W 24/10* (2013.01); *H04W 24/02* (2013.01)

(58) Field of Classification Search
CPC ............................. H04W 8/00; H04W 24/00
See application file for complete search history.

(56) References Cited

U.S. PATENT DOCUMENTS

| 2011/0183661 | A1 | 7/2011 | Yi et al. |
| 2012/0088457 | A1* | 4/2012 | Johansson ............ H04W 24/10 455/67.11 |
| 2012/0089876 | A1* | 4/2012 | Racz .................... H04W 24/08 714/45 |

(Continued)

FOREIGN PATENT DOCUMENTS

| CN | 102123415 A | 7/2011 |
| CN | 102123416 A | 7/2011 |

(Continued)

OTHER PUBLICATIONS

"MDT location control and correlation", Huawei, 3GPP TSG-RAN WG2 #70bis, Aug. 23-27, 2010, 8 pages.

(Continued)

*Primary Examiner* — Timothy J Weidner

(57) ABSTRACT

The present invention discloses a method and an apparatus for obtaining terminal minimization of drive-tests data, relates to the field of communication technologies, and solves a problem that when determining, according to minimization of drive-tests (MDT) data, that a current operating status of a network is abnormal, an operation, maintenance and administration (OAM) cannot accurately determine whether the abnormality of the network is caused by a terminal or the network itself since the MDT data received by the OAM does not include an identity of the terminal. The method includes: obtaining MDT data measured by a terminal and an identity of the terminal; and reporting the MDT data measured by the terminal and the identity of the terminal to an OAM. Embodiments of the present invention are mainly applied to a process of obtaining terminal minimization of drive-tests data.

13 Claims, 12 Drawing Sheets

(51) Int. Cl.
*H04W 24/10* (2009.01)
*H04W 24/02* (2009.01)

(56) References Cited

U.S. PATENT DOCUMENTS

2013/0137460 A1* 5/2013 Bodog .................. H04W 24/10
455/456.2
2013/0142143 A1 6/2013 Yan et al.
2013/0324106 A1* 12/2013 Bodog .................. H04W 24/10
455/422.1

FOREIGN PATENT DOCUMENTS

| CN | 102378236 A | 3/2012 |
|---|---|---|
| WO | WO 2011/120585 A1 | 10/2011 |
| WO | WO 2011/162668 A1 | 12/2011 |

OTHER PUBLICATIONS

"Include the user consent in MDT activation", NEC, 3GPP TSG-SA5 (Telecom Management), Feb. 28-Mar. 4, 2011, 8 pages.
"Super CR for combination of: 1. Modify MDT log retrieval procedures to protect user privacy and prevent network spying, 2. Support multiple cells in area based MDT", Huawei, et al., 3GPP TSG SA WG5 (Telecom Management) Meeting #80, Nov. 14-18, 2011, 10 pages.
"3rd Generation Partnership Project; Technical Specification Group Services and System Aspects; Telecommunication management; Subscriber and equipment trace; Trace concepts and requirements (Release 11)", 3GPP TS 32.421 V11.2.0, Mar. 2012, 37 pages.
3rd Generation Partnership Project; Technical Specification Group Radio Access Network; Radio Resource Control (RRC); Protocol specification (Release 11), 3GPP TS 25.331 V11.1.0, Mar. 2012, 1911 pages.
"3rd Generation Partnership Project; Technical Specification Group Radio Access Network; Medium Access Control (MAC) protocol specification (Release 11)", 3GPP TS 25.321 V11.0.0, Dec. 2011, 198 pages.
"3rd Generation Partnership Project; Technical Specification Group Radio Access Network; UTRAN Iu interface Radio Access Network Application Part (RANAP) signalling (Release 10)", 3GPP TS 25.413 V10.5.0, Mar. 2012, 428 pages.
"3rd Generation Partnership Project; Technical Specification Group Services and System Aspects; Telecommunication management; Subscriber and equipment trace; Trace control and configuration management (Release 11)", 3GPP TS 32.422 V11.3.0, Mar. 2012, 121 pages.

* cited by examiner

METHOD AND APPARATUS FOR OBTAINING TERMINAL MINIMIZATION OF DRIVE-TESTS DATA

CROSS-REFERENCE TO RELATED APPLICATION

This application is a continuation of International Application No. PCT/CN2013/072330, filed on Mar. 8, 2013, which claims priority to Chinese Patent Application No. 201210097632.5, filed on Apr. 5, 2012, both of which are hereby incorporated by reference in their entireties.

TECHNICAL FIELD

The present invention relates to the field of communication technologies, and in particular, to a method and an apparatus for obtaining terminal minimization of drive-tests data.

BACKGROUND

At present, an MDT (Minimization of Drive-Tests, minimization of drive-tests) method is usually adopted when whether an operating status of a network system is normal is monitored. The MDT method may be divided into two categories including an administration-based MDT method and a signaling-based MDT method, or the MDT method may also be divided into anon-real-time reporting MDT (Logging MDT) method and a real-time reporting MDT (Immediate MDT) method. For example, an administration-based non-real-time reporting MDT includes the following specific steps:

Step 1: An OAM (Operations Administration and Maintenance, operation, maintenance and administration) sends a trace session activation message carrying an MDT configuration to an RNC (Radio Network Controller, radio network controller).

Step 2: After receiving the trace session activation message carrying the MDT configuration sent by the OAM, the RNC sends a log configuration message to a terminal selected, so as to trigger the terminal to execute MDT measurement.

Step 3: The RNC sends a terminal information request message (UE Information Request) to the terminal to request the terminal to report MDT data measured by the terminal.

Step 4: The terminal reports a terminal information response message (UE Information Response) carrying the MDT data to the RNC.

Step 5: The RNC reports, to the OAM, the MDT data reported by the terminal.

After receiving the MDT data reported by the terminal, the OAM may determine, according to the MDT data, whether the current operating status of the network is abnormal.

However, in the existing method, when determining, according to the MDT data, that the current operating status of the network is abnormal, the OAM cannot accurately determine whether the abnormality of the network is caused by the terminal or the network itself since the MDT data received by the OAM does not include an identity of the terminal.

SUMMARY

Multiple aspects of the present invention provide a method and an apparatus for obtaining terminal minimization of drive-tests data, so that an OAM can obtain MDT data measured by a terminal while obtaining an identity of the terminal, and accurately determine whether an abnormality of a network is caused by the terminal or the network itself.

One aspect of the present invention provides a method for obtaining terminal minimization of drive-tests data, including: obtaining MDT data measured by a terminal and an identity of the terminal; and reporting the MDT data measured by the terminal and the identity of the terminal to an OAM.

Another aspect of the present invention provides a method for obtaining terminal minimization of drive-tests data, including: obtaining, by an OAM, MDT data measured by a terminal and an identity of the terminal; and saving, by the OAM, the MDT data measured by the terminal and the identity of the terminal.

Another aspect of the present invention provides a network element, including: an obtaining unit, configured to obtain MDT data measured by a terminal and an identity of the terminal; and a reporting unit, configured to report the MDT data measured by the terminal and the identity of the terminal to an OAM.

Another aspect of the present invention provides an OAM, including: a receiving unit, configured to receive MDT data measured by a terminal and an identity of the terminal reported by a network element; and a saving unit, configured to save the MDT data measured by the terminal and the identity of the terminal.

Based on the foregoing technical solutions, an OAM can obtain MDT data measured by a terminal and an identity of a terminal, so that the OAM can accurately determine whether an abnormality of a network is caused by the terminal or the network itself.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
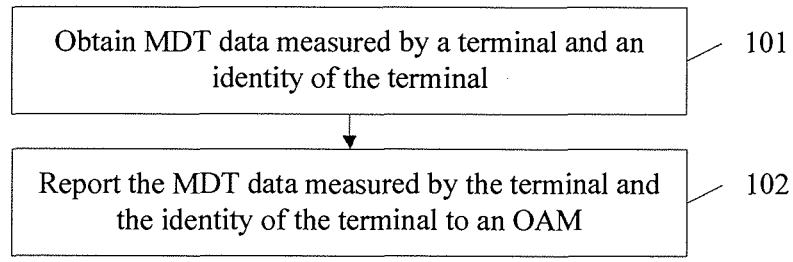
FIG. 1 is a flowchart of a method for obtaining terminal minimization of drive-tests data according to an embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The following descriptions propose specific details, such as specific system structures, interfaces and technologies for description rather than limitation, so as to understand the present invention thoroughly. However, a person skilled in the art should understand that the present invention may also be implemented in other embodiments that do not have these specific details. In other cases, detailed descriptions of well-known apparatus, circuits and methods are omitted, so as to prevent unnecessary details from obstructing descriptions of the present invention.

In this specification, various aspects are described with reference to a terminal and/or a base station controller and/or a core network node (Core Network, CN) and/or an OAM.

The terminal may be a wireless terminal or a wired terminal. The wireless terminal may be a device providing voice and/or data connectivity for a user, a handheld device having a wireless connection function, or other processing devices connected to a wireless modem. The wireless terminal may communicate with one or more core networks through a radio access network (for example, RAN, Radio Access Network). The wireless terminal may be a mobile terminal, such as a mobile phone (or called a "cellular" phone) and a computer having a mobile terminal, for example, a portable, pocket-sized, handheld, computer built-in or vehicle-mounted mobile apparatus, which exchanges language and/or data with the radio access network. For example, a personal communication service (PCS, Personal Communication Service) phone, a cordless telephone set, a Session Initiation Protocol (SIP) phone set, a wireless local loop (WLL, Wireless Local Loop) station, a personal digital assistant (PDA, Personal Digital Assistant), and the like. The wireless terminal may also be called a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

The core network node may be a serving general packet radio service support node (Serving GPRS Support Node, SGSN) or a mobile switch center (Mobile Switch Center, MSC).

In addition, the terms "system" and "network" are frequently interchangeably used in this specification. The term "and/or" in this specification merely describes an association relationship of associated objects, representing three relationships may exist, for example, A and/or B may represent three cases: A exists alone, both A and B exist, and B exists alone. In addition, the symbol "/" in this specification usually represents that associated objects before and after the symbol are in an "or" relationship.

As shown in FIG. 1, an embodiment of the present invention provides a method for obtaining terminal minimization of drive-tests data, which is specifically described as follows:

101. Obtain MDT data measured by a terminal and an identity of the terminal.

The identity of the terminal is at least one of an international mobile station equipment identity (International Mobile station Equipment Identity, IMEI for short below), an international mobile station equipment identity and software version number (International Mobile station Equipment Identity and Software Version Number, IMEISV for short below) and a type allocation code (Type Allocation Code, TAC for short below).

Figure 2:
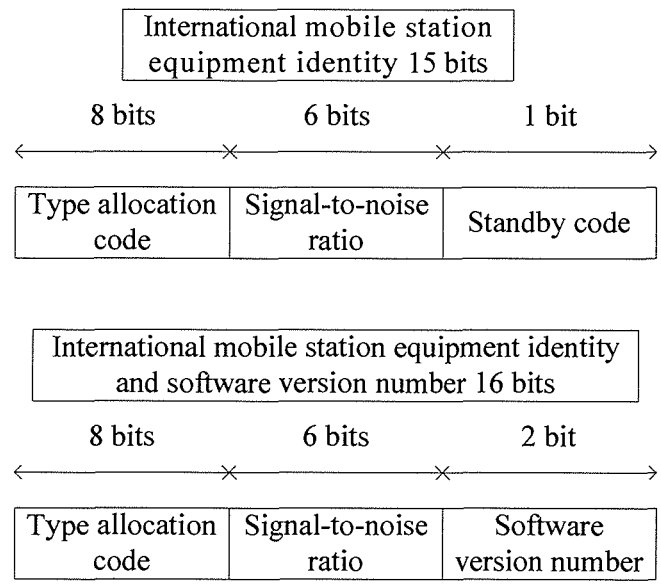
FIG. 2 is exemplary format diagrams of an IMEI and an IMEISV in the prior art.

FIG. 2 shows formats of the IMEI and the IMEISV of the terminal, where the TAC of the terminal is the first eight bits of the IMEI of the terminal or the first eight bits of the IMEISV of the terminal.

102. Report the MDT data measured by the terminal and the identity of the terminal to an OAM.

In the method for obtaining terminal minimization of drive-tests data provided by the embodiment of the present invention, MDT data measured by a terminal and an identity of the terminal are obtained, and the MDT data measured by the terminal and the identity of the terminal are reported to an OAM, thereby solving a problem that when determining, according to the MDT data, that a current operating status of a network is abnormal, the OAM cannot accurately determine whether the abnormality of the network is caused by the terminal or the network itself since the MDT data received by the OAM does not include the identity of the terminal. According to the embodiment of the present invention, a network element reports the obtained MDT data measured by the terminal and the identity of the terminal to the OAM, so that the OAM determines, according to the MDT data of the terminal, whether the abnormality of the network is caused by the terminal or the network itself. When obtaining the MDT data measured by a plurality of terminals and identities of the plurality of terminals, if the OAM determines, according to the MDT data measured by a certain terminal or terminals of a certain type, that the current operating status of the network is abnormal while determining, according to the MDT data measured by other terminals, that the current operating status of the network is normal, it may be determined that the abnormality of the network is caused by the certain terminal or the terminals of the certain type; if the OAM determines, according to the MDT data measured by all the terminals or by terminals whose quantity is greater than a certain set proportion, that the current operating status of the network is abnormal, it may be determined that the abnormality of the network is caused by the network itself.

Figure 3:
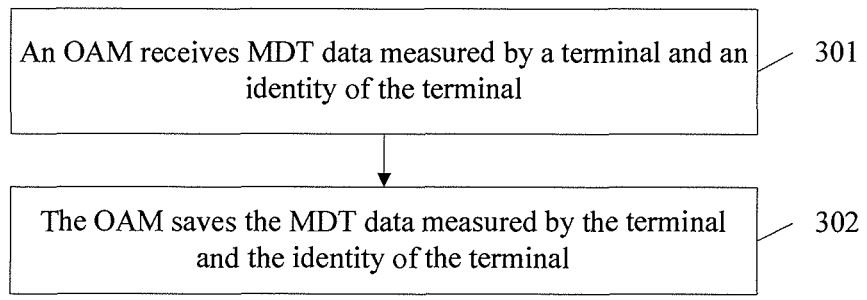
FIG. 3 is a flowchart of another method for obtaining terminal minimization of drive-tests data according to an embodiment of the present invention.

As shown in FIG. 3, an embodiment of the present invention further provides a method for obtaining terminal minimization of drive-tests data, which is specifically described as follows:

301. An OAM receives MDT data measured by a terminal and an identity of the terminal.

Relevant descriptions of the identity of the terminal are consistent with descriptions in step 101.

302: The OAM saves the MDT data measured by the terminal and the identity of the terminal.

In the method for obtaining terminal minimization of drive-tests data provided by the embodiment of the present invention, an OAM obtains MDT data measured by a terminal and an identity of the terminal, and saves the MDT data of the terminal and the identity of the terminal, thereby solving a problem that when determining, according to the MDT data, that a current operating status of a network is abnormal, the OAM cannot accurately determine whether the abnormality of the network is caused by the terminal or the network itself since the MDT data received by the OAM does not include the identity of the terminal. According to the embodiment of the present invention, when obtaining the MDT data measured by a plurality of terminals and identities of the plurality of terminals, if the OAM determines, according to the MDT data measured by a certain terminal or terminals of a certain type, that the current operating status of the network is abnormal while determining, according to the MDT data measured by other terminals, that the current operating status of the network is normal, it may be determined that the abnormality of the network is caused by the certain terminal or the terminals of the certain type; if the OAM determines, according to the MDT data measured by all the terminals or by terminals whose quantity is greater than a certain set proportion, that the current operating status of the network is abnormal, it may be determined that the abnormality of the network is caused by the network itself.

For example, when receiving the MDT data measured by 10 terminals and the identities of the terminals, if the OAM determines, according to the MDT data measured by one terminal, that the current operating status of the network is abnormal while determining, according to the MDT data measured by other terminals, that the current operating status of the network is normal, it may be determined that the abnormality of the network is caused by the one terminal rather than caused by the network itself, where a specific terminal that causes the abnormality may be determined according to the identity of the one terminal; if the OAM determines, according to the MDT data measured by the 10 terminals, that the current operating status of the network is abnormal, it may be determined that the abnormality is caused by the network itself, thereby helping determine a network problem and solve the problem more quickly and efficiently.

Figure 4:
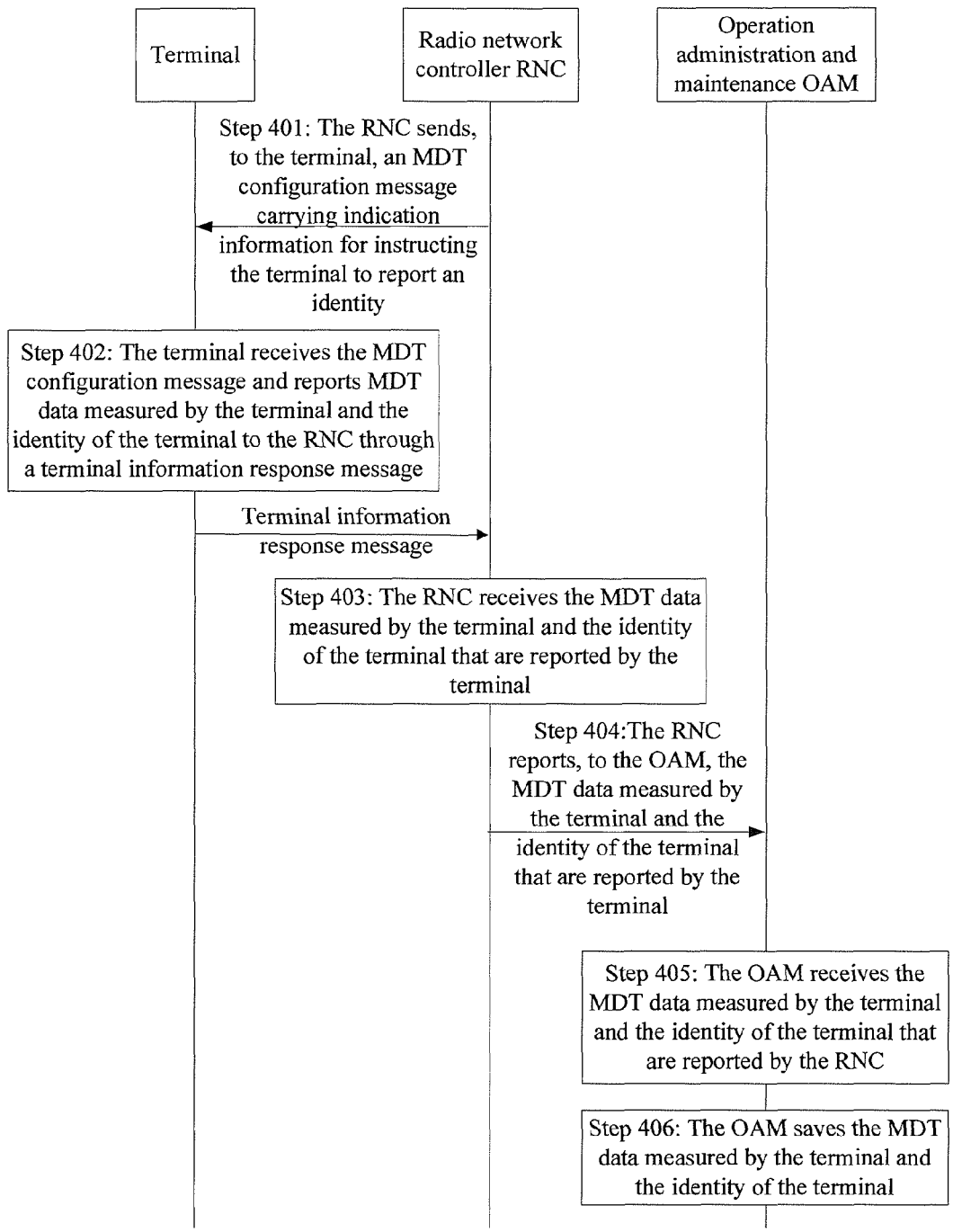
FIG. 4 is a flowchart of another method for obtaining terminal minimization of drive-tests data according to an embodiment of the present invention.

As shown in FIG. 4, an embodiment of the present invention provides a method for obtaining terminal minimization of drive-tests data, where the method adopts a non-real-time MDT reporting method.

When an RNC receives a trace session activation (Trace Session Activation) message sent by an OAM, the RNC selects a terminal to execute MDT measurement.

401: The RNC sends, to the terminal, an MDT configuration message carrying indication information for instructing the terminal to report an identity, so as to instruct the terminal to report MDT data measured by the terminal and the identity of the terminal to the RNC.

Relevant descriptions of the identity of the terminal are consistent with descriptions in step 101.

It should be noted that when the non-real-time MDT reporting method is adopted, the MDT configuration message is a log configuration message or a terminal information request message; when a real-time MDT reporting method is adopted, the MDT configuration message is a measurement control message.

Step 401 may be implemented by using a method A1 and a method A2 as follows:

Method A1: The RNC sends, to the terminal, a log configuration (Logging Measurement Configuration) message carrying terminal report indication information, so as to instruct the terminal to execute the MDT measurement; and the RNC sends a terminal information request (UE Information Request) message to the terminal, so as to trigger the terminal to report the MDT data measured by the terminal and the identity of the terminal to the RNC.

Method A2: The RNC sends a log configuration message to the terminal, so as to instruct the terminal to execute the MDT measurement; and the RNC sends, to the terminal, a terminal information request message carrying terminal report indication information, so as to trigger the terminal to report the MDT data measured by the terminal and the identity of the terminal to the RNC.

402: The terminal receives the MDT configuration message and reports the MDT data measured by the terminal and the identity of the terminal to the RNC by using a terminal information response (UE Information Response) message.

Step 402 specifically includes the following four steps:

Step 4021: The terminal receives the log configuration message in step 401.

Step 4022: The terminal executes the MDT measurement.

Step 4023: The terminal receives the terminal information request message in step 401.

Step 4024: The terminal reports the MDT data measured by the terminal and the identity of the terminal to the RNC by using the terminal information response (UE Information Response) message.

403: The RNC receives the MDT data measured by the terminal and the identity of the terminal that are reported by the terminal It should be noted that, when the identity of the terminal received by the RNC is an IMEI or an IMEISV while the identity of the terminal reported to an OAM is a TAC, step 403 further includes: extracting, by the RNC, a TAC part of the IMEI or the IMEISV of the terminal.

To be specific, if the identity of the terminal received by the RNC is the IMEI or the IMEISV, the first eight bits of the IMEI or the IMEISV are extracted as the TAC of the terminal. The following uses the IMEI as an example.

Suppose that the identity of the terminal received by the RNC is the IMEI (for example, 354855021748748), referring to a constitution of the IMEI in FIG. 2, it can be seen that the first eight bits of the IMEI are the TAC. Therefore, the TAC extracted is 35485502.

404: The RNC reports, to the OAM, the MDT data measured by the terminal and the identity of the terminal that are reported by the terminal.

405: The OAM receives the MDT data measured by the terminal and the identity of the terminal that are reported by the RNC.

406: The OAM saves the MDT data measured by the terminal and the identity of the terminal.

Based on the method provided by the embodiment, the OAM can obtain the MDT data measured by the terminal and the identity of the terminal. The method may be applied to an administration-based real-time MDT sending method, or an administration-based non-real-time MDT sending method.

Figure 5:
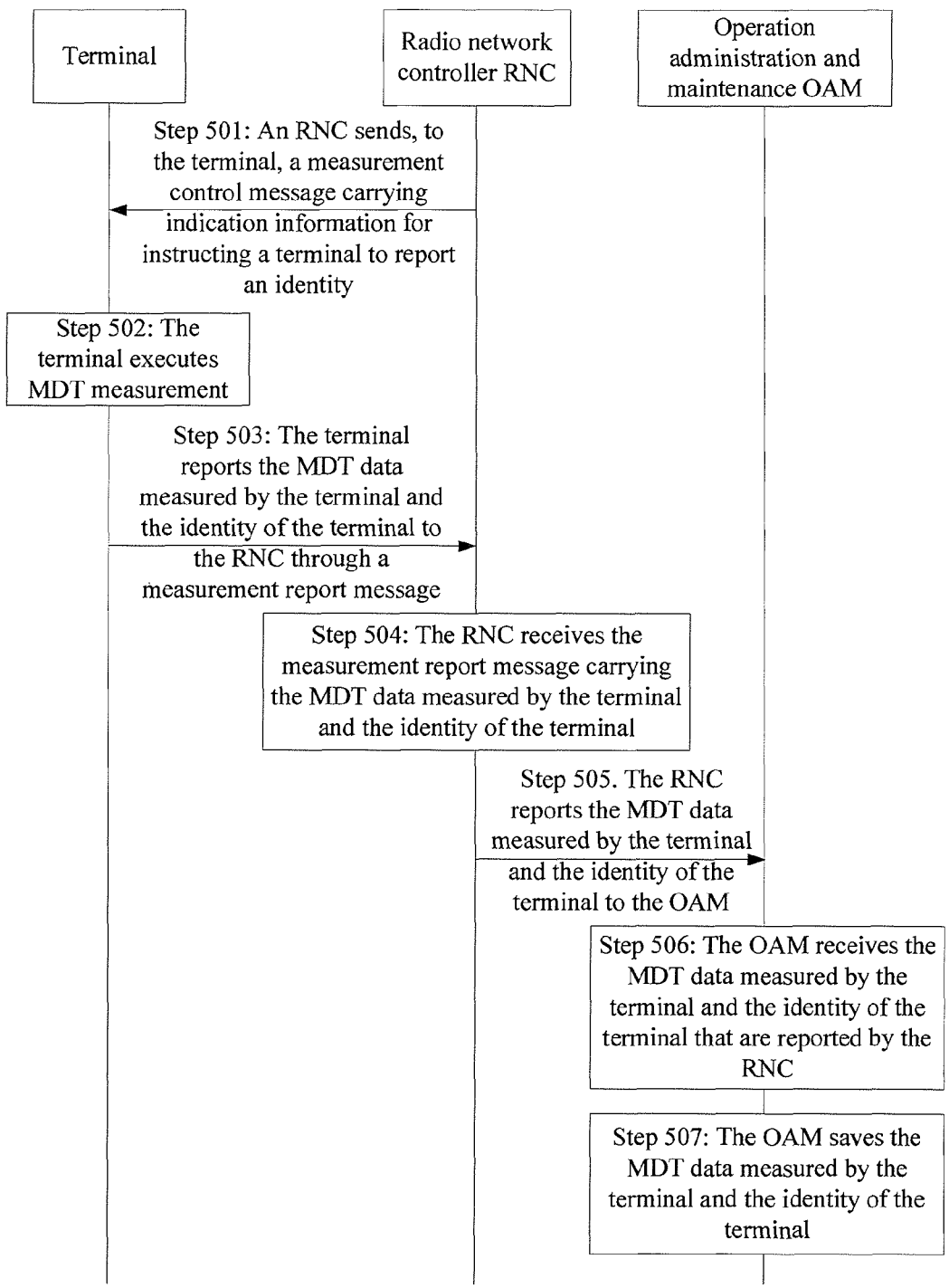
FIG. 5 is a flowchart of another method for obtaining terminal minimization of drive-tests data according to an embodiment of the present invention.

As shown in FIG. 5, an embodiment of the present invention provides a method for obtaining terminal minimization of drive-tests data, where the method adopts a real-time MDT sending method.

501: An RNC sends, to a terminal, a measurement control (Measurement Control) message carrying indication information for instructing the terminal to report an identity, so as to instruct the terminal to execute MDT measurement and report MDT data measured by the terminal and an identity of the terminal to the RNC.

Relevant descriptions of the identity of the terminal are consistent with descriptions in step 101.

502: The terminal executes the MDT measurement.

503: The terminal reports the MDT data measured by the terminal and the identity of the terminal to the RNC by using a measurement report (Measurement Report) message.

504: The RNC receives the measurement report (Measurement Report) message carrying the MDT data measured by the terminal and the identity of the terminal.

It should be noted that, when the identity of the terminal received by the RNC is an IMEI or an IMEISV while the identity of the terminal reported to an OAM is a TAC, step 504 further includes: extracting, by the RNC, a TAC part of the IMEI or the IMEISV of the terminal.

Implementation of the extracting the TAC part is consistent with relevant descriptions in step 403.

505: The RNC reports the MDT data measured by the terminal and the identity of the terminal to the OAM.

506: The OAM receives the MDT data measured by the terminal and the identity of the terminal that are reported by the RNC.

507: The OAM saves the MDT data measured by the terminal and the identity of the terminal.

Based on the method provided by the embodiment, the OAM can obtain the MDT data measured by the terminal and the identity of the terminal. The method may be applied to an administration-based real-time MDT sending method, or an administration-based non-real-time MDT sending method.

Figure 6:
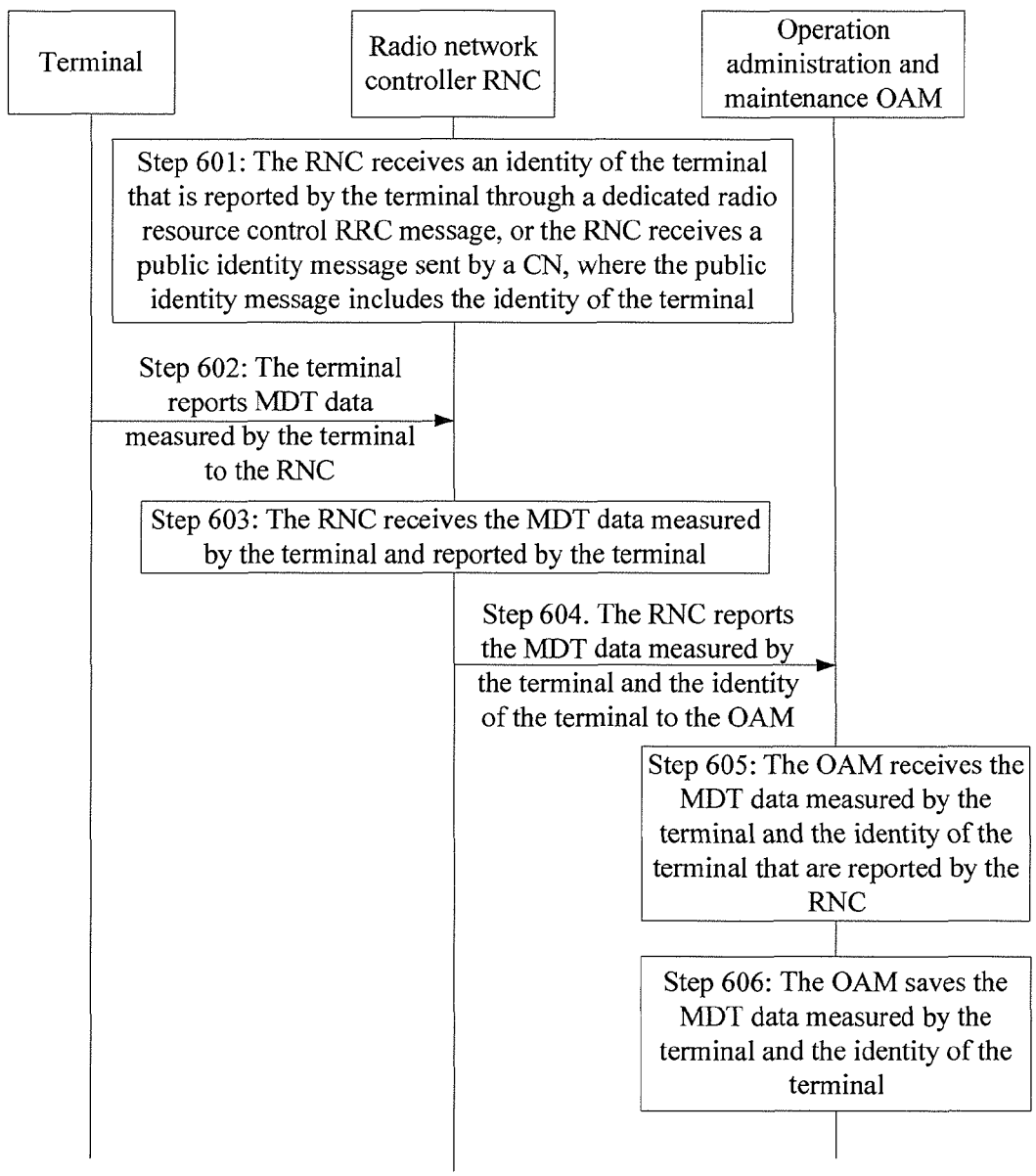
FIG. 6 is a flowchart of another method for obtaining terminal minimization of drive-tests data according to an embodiment of the present invention.

As shown in FIG. 6, an embodiment of the present invention further provides a method for obtaining terminal minimization of drive-tests data.

601: An RNC receives an identity of a terminal that is reported by the terminal by using a dedicated radio resource control RRC message, or the RNC receives a public identity message sent by a CN, where the public identity message includes the identity of the terminal.

The dedicated radio resource control RRC message is a universal terrestrial radio access network mobility information confirm (UTRAN Mobility Information Confirm) message or a radio resource control connection setup complete (RRC CONNECTION SETUP COMPLETE) message.

Relevant descriptions of the identity of the terminal are consistent with descriptions in step 101.

It should be noted that, when the identity of the terminal in step 601 is an IMEI or an IMEISV while the identity of the terminal reported to an OAM is a TAC, step 601 further includes: extracting, by the RNC, a TAC part of the IMEI or the IMEISV of the terminal.

Implementation of the extracting a TAC part is consistent with relevant descriptions in step 403.

602: The terminal reports MDT data measured by the terminal to the RNC.

603: The RNC receives the MDT data measured by the terminal which is reported by the terminal.

604. The RNC reports the MDT data measured by the terminal and the identity of the terminal to the OAM.

605: The OAM receives the MDT data measured by the terminal and the identity of the terminal that are reported by the RNC.

606: The OAM saves the MDT data measured by the terminal and the identity of the terminal.

According to the method provided by the embodiment in FIG. 6, a CN sends an identity of a terminal to an RNC, so that when receiving the MDT data measured by the terminal, the RNC can report the MDT data measured by the terminal and the identity of the terminal to an OAM. The method may be applied to an administration-based real-time MDT sending method, an administration-based non-real-time MDT sending method, a signaling-based real-time MDT sending method, or a signaling-based non-real-time MDT sending method.

Figure 7:
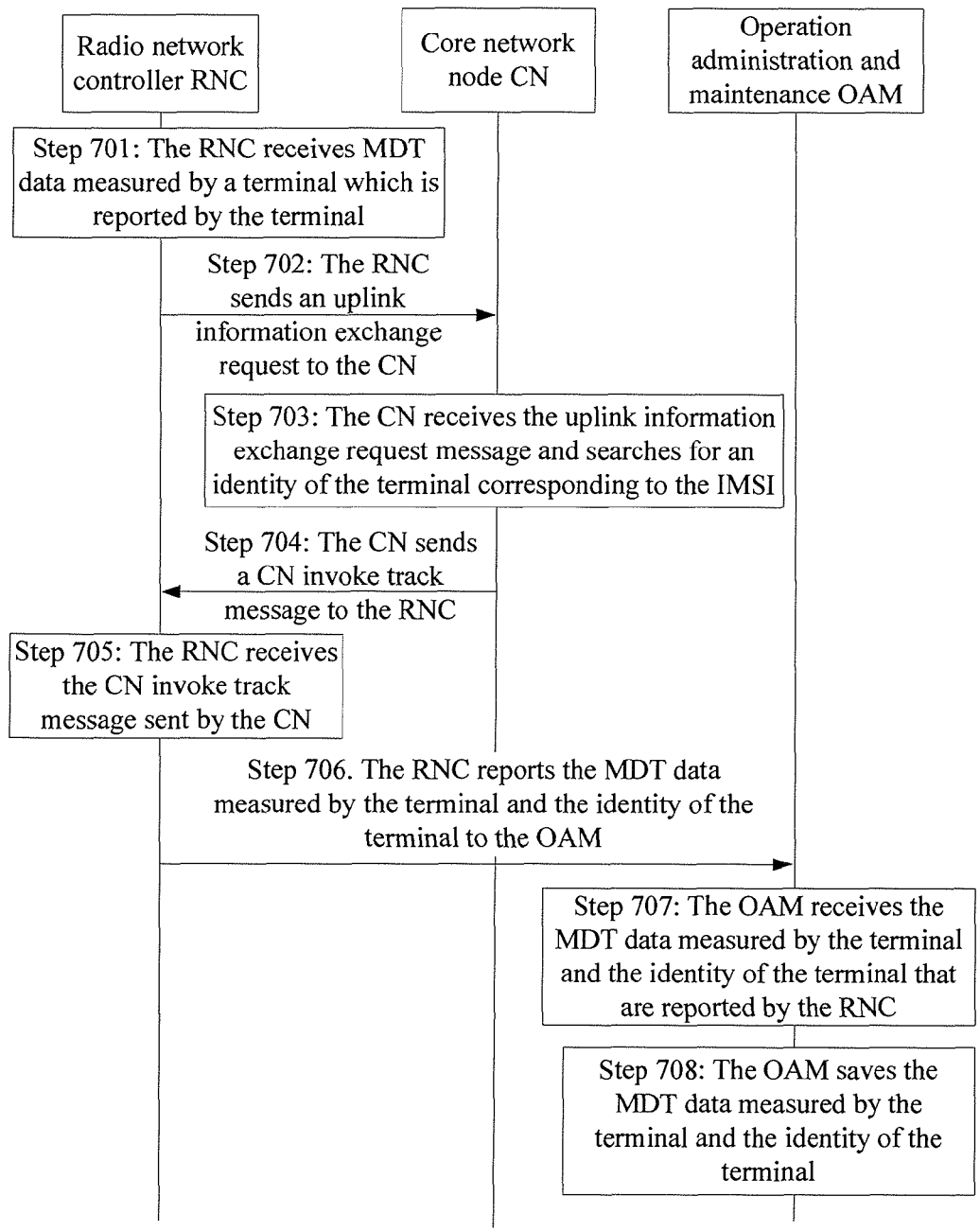
FIG. 7 is a flowchart of another method for obtaining terminal minimization of drive-tests data according to an embodiment of the present invention.

As shown in FIG. 7, an embodiment of the present invention further provides a method for obtaining terminal minimization of drive-tests data, which is specifically described as follows:

701: An RNC receives MDT data measured by a terminal which is reported by the terminal.

702: The RNC sends an uplink information exchange request (Uplink Information Exchange Request) message to a CN, where the uplink information exchange request message includes an IMSI and a trace reference (Trace Reference, TR for short below) of the terminal so as to obtain an identity of the terminal corresponding to the IMSI.

Relevant descriptions of the identity of the terminal are consistent with descriptions in step 101.

703: The CN receives the uplink information exchange request message and searches for the identity of the terminal corresponding to the IMSI.

704: The CN sends a core network invoke trace (CN INVOKE TRACE) message to the RNC.

The core network invoke trace message carries the identity of the terminal corresponding to the IMSI.

705: The RNC receives the core network invoke trace message sent by the CN, where the core network invoke trace message includes the identity of the terminal corresponding to the IMSI.

The core network invoke trace message further includes a TR of the terminal.

It should be noted that, when the identity of the terminal is an IMEI or an IMEISV while the identity of the terminal reported to an OAM is a TAC, step 706 further includes: extracting, by the RNC, a TAC part of the terminal of the IMEI or the IMEISV of the terminal.

Implementation of the extracting the TAC part is consistent with relevant descriptions in step 403.

706. The RNC reports the MDT data measured by the terminal and the identity of the terminal to the OAM.

707: The OAM receives the MDT data measured by the terminal and the identity of the terminal that are reported by the RNC.

708: The OAM saves the MDT data measured by the terminal and the identity of the terminal.

Figure 8:
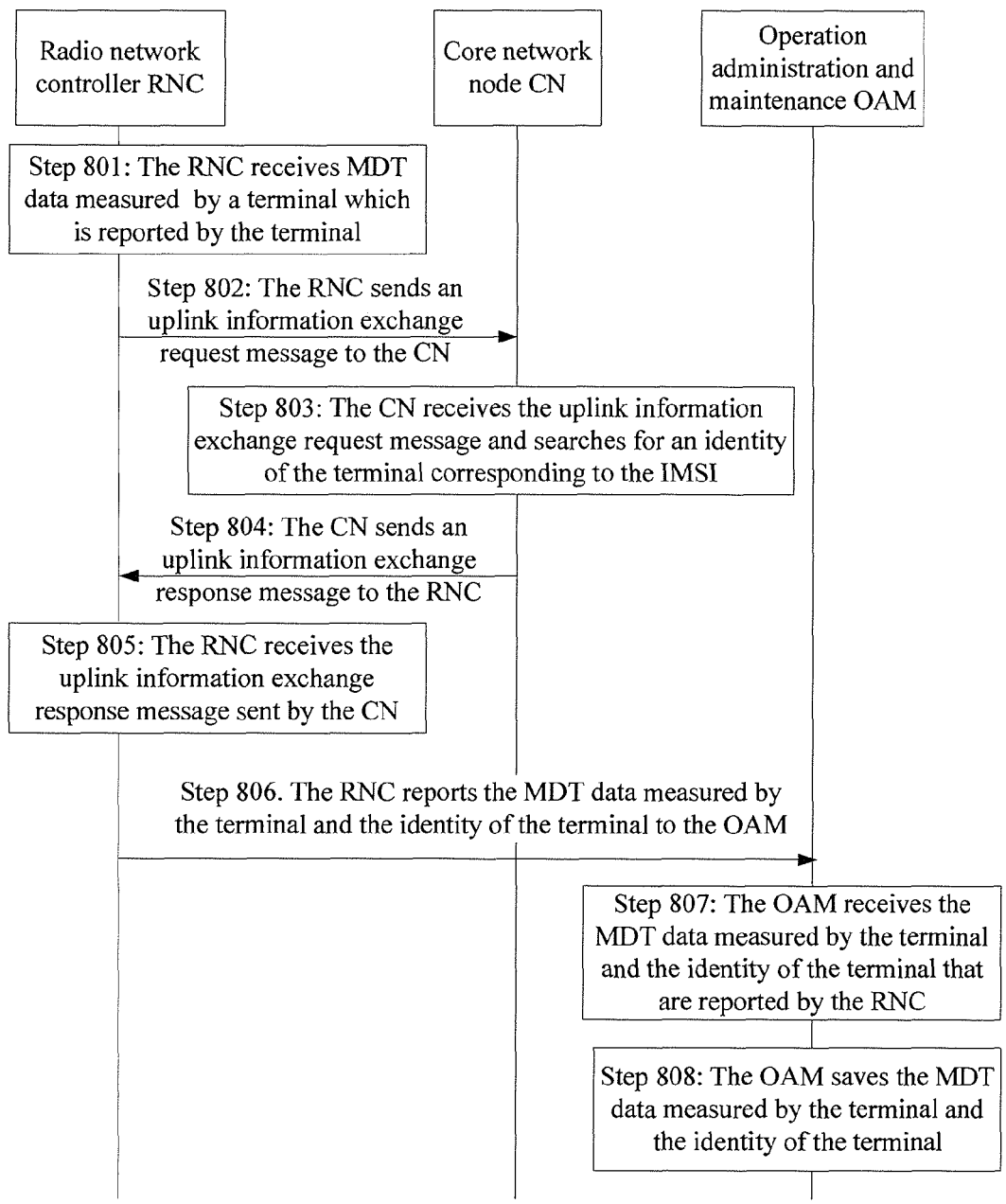
FIG. 8 is a flowchart of another method for obtaining terminal minimization of drive-tests data according to an embodiment of the present invention.

As shown in FIG. 8, an embodiment of the present invention further provides a method for obtaining terminal minimization of drive-tests data, which is specifically described as follows:

801: An RNC receives MDT data measured by a terminal and reported by the terminal.

802: The RNC sends an uplink information exchange request message to a CN, where the uplink information exchange request message includes an IMSI of the terminal.

803: The CN receives the uplink information exchange request message and searches for an identity of the terminal corresponding to the IMSI.

Relevant descriptions of the identity of the terminal are consistent with descriptions in step 101.

804: The CN sends an uplink information exchange response (Uplink Information Exchange Response) message to the RNC.

805. The RNC receives the uplink information exchange response message sent by the CN, where the uplink information exchange response message includes the identity of the terminal corresponding to the IMSI.

It should be noted that, when the identity of the terminal is an IMEI or an IMEISV while the identity of the terminal reported to an OAM is a TAC, step 805 further includes: extracting, by the RNC, a TAC part of the IMEI or the IMEISV of the terminal.

Implementation of the extracting the TAC part is consistent with relevant descriptions in step 403.

806. The RNC reports the MDT data measured by the terminal and the identity of the terminal to the OAM.

807: The OAM receives the MDT data measured by the terminal and the identity of the terminal that are reported by the RNC.

808: The OAM saves the MDT data measured by the terminal and the identity of the terminal.

According to the methods provided by the embodiment in FIG. 7 and FIG. 8, after receiving MDT data sent by a terminal, an RNC requests an identity of the terminal from a CN, and reports MDT data measured by the terminal and the identity of the terminal to an OAM. The method may be applied to an administration-based real-time MDT sending method, an administration-based non-real-time MDT sending method, a signaling-based real-time MDT sending method, or a signaling-based non-real-time MDT sending method.

Figure 9:
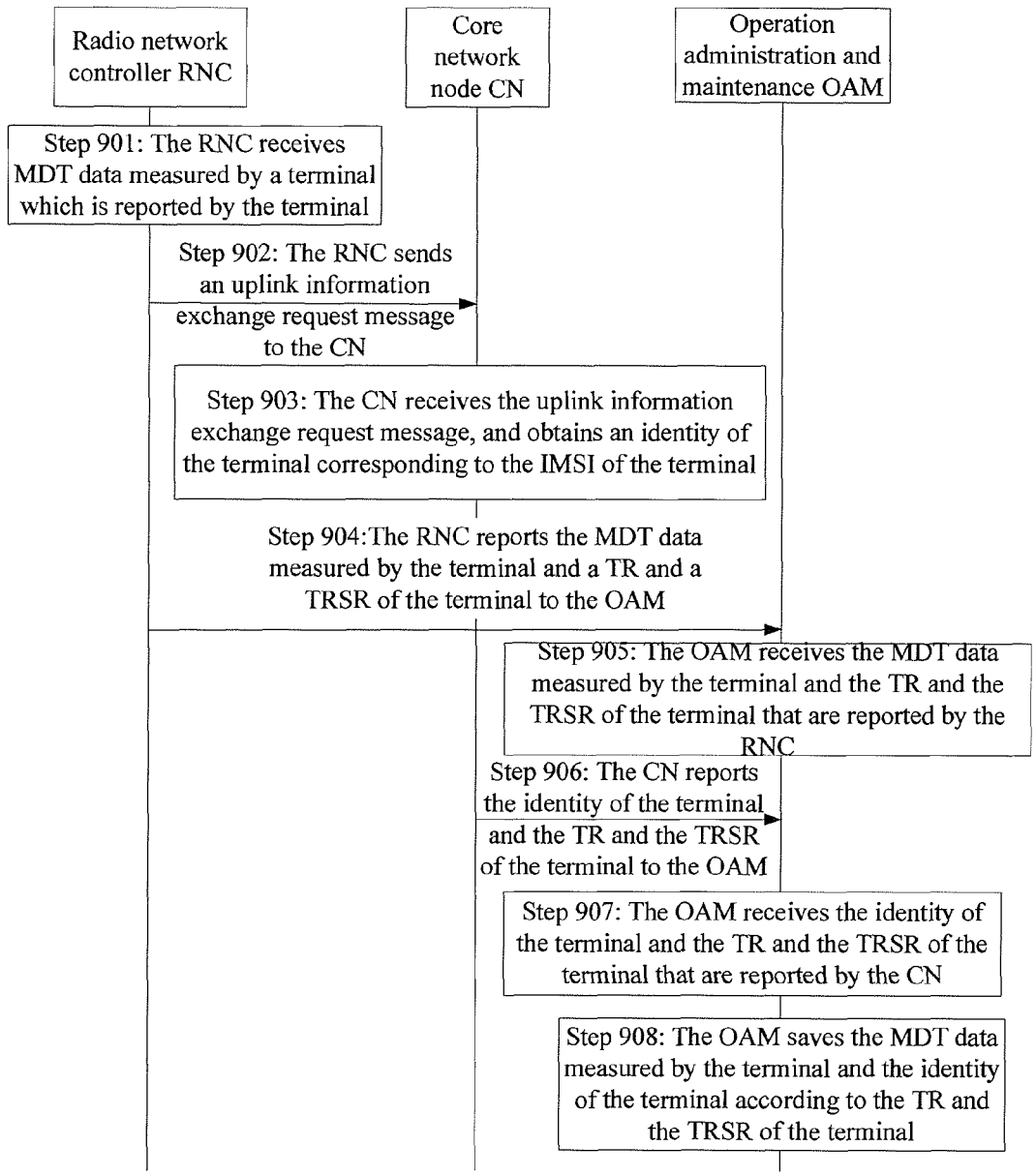
FIG. 9 is a flowchart of another method for obtaining terminal minimization of drive-tests data according to an embodiment of the present invention.

As shown in FIG. 9, an embodiment of the present invention further provides a method for obtaining terminal minimization of drive-tests data, which is specifically described as follows:

901: An RNC receives MDT data measured by a terminal which is reported by the terminal.

902: The RNC sends an uplink information exchange request message to a CN, where the uplink information exchange request message includes an IMSI, a TR and a TRSR (Trace Recording Session Reference, trace recording session reference) of the terminal.

903: The CN receives the uplink information exchange request message and obtains an identity of the terminal corresponding to the IMSI of the terminal.

Relevant descriptions of the identity of the terminal are consistent with descriptions in step 101.

After receiving the uplink information exchange request message including the IMSI of the terminal, the CN searches for the identity of the terminal corresponding to the IMSI.

It should be noted that, when the identity of the terminal obtained by the CN is an IMEI or an IMEISV while the identity of the terminal reported to the OAM is a TAC, step 903 further includes: obtaining, by the CN, a TAC of the terminal according to the IMEI or the IMEISV of the terminal.

Implementation of the extracting the TAC part is consistent with relevant descriptions in step 403.

904: The RNC reports the MDT data measured by the terminal and the TR and the TRSR of the terminal to the OAM.

905: The OAM receives the MDT data measured by the terminal and the TR and the TRSR of the terminal that are reported by the RNC.

906: The CN reports the identity of the terminal and the TR and the TRSR of the terminal to the OAM, so that the OAM saves the MDT data measured by the terminal and the identity of the terminal according to the TR and the TRSR of the terminal.

907: The OAM receives the identity of the terminal and the TR and the TRSR of the terminal that are reported by the CN.

908: The OAM saves the MDT data measured by the terminal and the identity of the terminal according to the TR and the TRSR of the terminal.

According to the method provided by the embodiment of the present invention, an RNC is utilized to report MDT data measured by a terminal to an OAM. After the RNC sends a request to a CN, the CN reports an identity of the terminal to the OAM, thereby determining MDT data measured by the terminal and the identity of the terminal. The method may be applied to an administration-based real-time MDT sending method, an administration-based non-real-time MDT sending method, a signaling-based real-time MDT sending method, or a signaling-based non-real-time MDT sending method.

Figure 10:
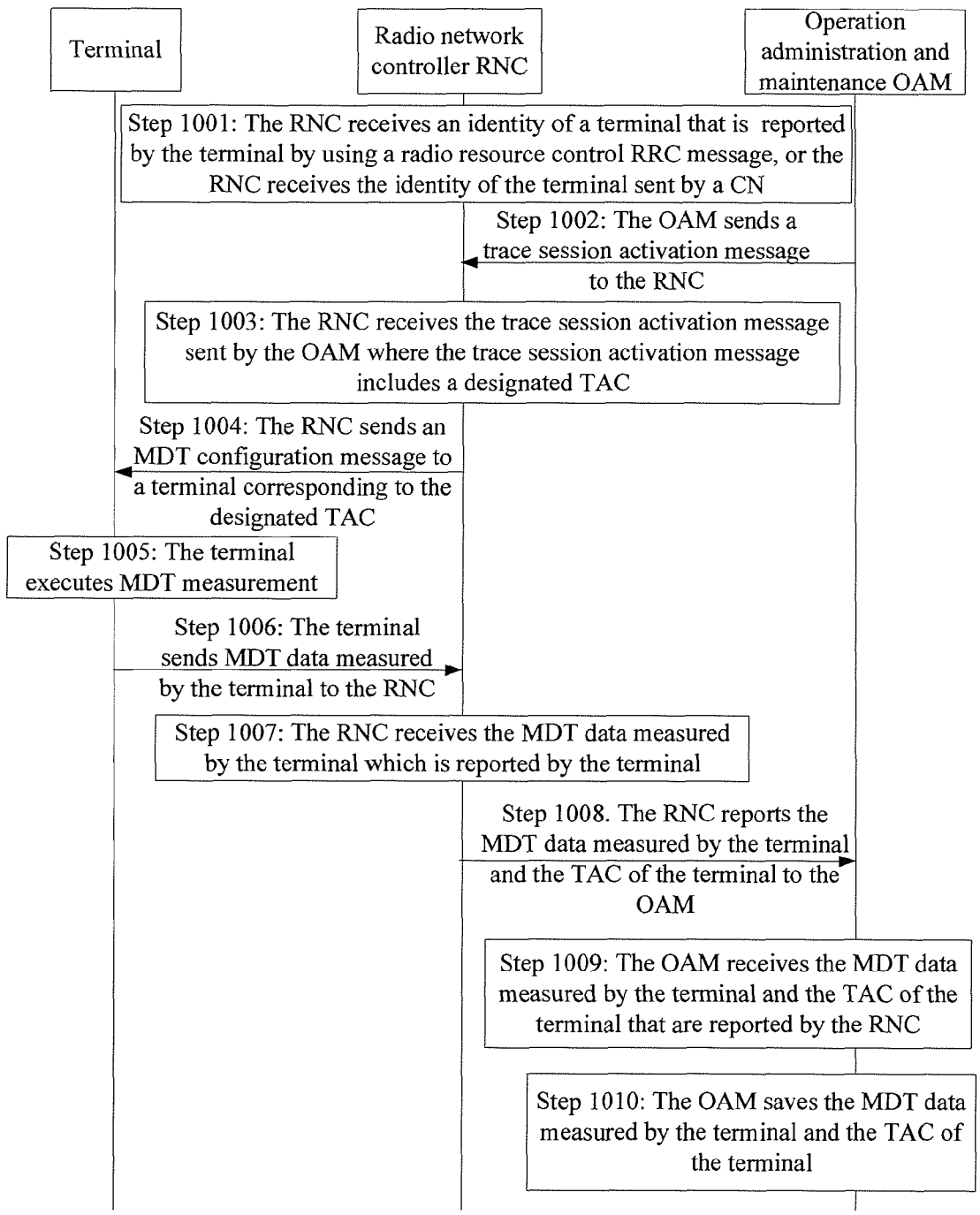
FIG. 10 is a flowchart of another method for obtaining terminal minimization of drive-tests data according to an embodiment of the present invention.

As shown in FIG. 10, an embodiment of the present invention further provides a method for obtaining terminal minimization of drive-tests data, which is specifically described as follows:

1001: An RNC receives an identity of a terminal that is reported by the terminal by using a dedicated radio resource control RRC message, or the RNC receives the identity of the terminal sent by a CN.

The dedicated radio resource control RRC message is a universal terrestrial radio access network mobility information confirm (UTRAN Mobility Information Confirm) message or a radio resource control connection setup complete (RRC CONNECTION SETUP COMPLETE) message.

Any one of step 601 and step 602, or step 702 to step 706, or step 802 to step 805 may be adopted for the RNC to implement the receiving of the identity of the terminal sent by the CN.

It should be noted that, when the identity of the terminal received by the RNC is an IMEI or an IMEISV, step 1001 further includes: extracting, by the RNC, a TAC part of the terminal of the IMEI or the IMEISV of the terminal.

Implementation of the extracting the TAC part is consistent with relevant descriptions in step 403.

1002: An OAM sends a trace session activation message to the RNC, where the trace session activation message includes a designated TAC;

1003: The RNC receives the trace session activation message sent by the OAM, where the trace session activation message includes the designated TAC.

1004: The RNC sends an MDT configuration message to a terminal corresponding to the designated TAC, so as to instruct the terminal to execute MDT measurement and report the MDT data measured by the terminal.

For example, when the designated TAC is 00000001, if TACs of a terminal 1, a terminal 2 and a terminal 3 saved in the RNC are all 00000001 while a TAC of a terminal 4 is 00000002, the RNC may send the MDT configuration message, so as to indicate the terminal 1/2/3 to execute MDT measurement.

When a non-real-time MDT sending method is adopted, sending a log configuration message and a terminal information request message to the terminal corresponding to the designated TAC in the prior art may be utilized, so as to trigger the terminal to execute the MDT measurement and report the MDT data measured by the terminal.

Alternatively, when a real-time MDT sending method is adopted, sending a measurement control message to the terminal corresponding to the designated TAC in the prior art may be utilized, so as to instruct the terminal to execute the MDT measurement and report the MDT data measured by the terminal.

1005: The terminal executes the MDT measurement.

1006: The terminal sends MDT data measured by the terminal to the RNC.

1007: The RNC receives the MDT data measured by the terminal which is reported by the terminal.

When the non-real-time MDT sending method is adopted, receiving a terminal information response message sent by the terminal in the prior art is utilized, where the terminal information response message includes the MDT data measured by the terminal.

Alternatively, when the real-time MDT sending method is adopted, receiving a measurement report message sent by the terminal in the prior art is utilized, where the measurement report message includes the MDT data measured by the terminal.

1008. The RNC reports the MDT data measured by the terminal and the TAC of the terminal to the OAM.

1009: The OAM receives the MDT data measured by the terminal and the TAC of the terminal that are reported by the RNC.

1010: The OAM saves the MDT data measured by the terminal and the TAC of the terminal.

According to the method of the embodiment in FIG. 10, an OAM may select a terminal corresponding to a designated TAC to execute MDT measurement. First, an RNC receives an identity of the terminal reported by the terminal, or an identity of the terminal sent by a CN, and extracts a TAC of the terminal. After a TAC designated by the OAM is received, the RNC obtains the TAC of the terminal in advance, finds the terminal corresponding to the designated TAC, utilizes the prior art to send an instruction for obtaining the MDT data to the terminal, and after obtaining the MDT data measured by the terminal, reports the MDT data measured by the terminal and the TAC of the terminal to the OAM.

Figure 11:
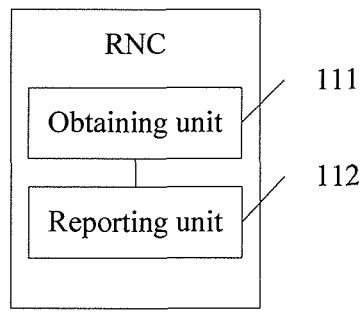
FIG. 11 is a structural diagram of a network element according to an embodiment of the present invention.

An embodiment of the present invention provides a network element. As shown in FIG. 11, the network element is an RNC, and the network element includes an obtaining unit 111 and a reporting unit 112.

The obtaining unit 111 is configured to obtain MDT data measured by a terminal and an identity of the terminal.

The reporting unit 112 is configured to report the MDT data measured by the terminal and the identity of the terminal to an OAM.

According to the network element provided by the embodiment of the present invention, an obtaining unit obtains MDT data measured by a terminal and an identity of the terminal and a reporting unit reports the MDT data measured by the terminal and the identity of the terminal to the OAM, so that the OAM determines, according to the MDT data of the terminal, that whether an abnormality of a network is caused by the terminal or the network itself. When obtaining the MDT data measured by a plurality of terminals and identities of the plurality of terminals, if the OAM determines, according to the MDT data measured by a certain terminal or terminals of a certain type, that a current operating status of the network is abnormal while determining, according to the MDT data measured by other terminals, that the current operating status of the network is normal, it may be determined that the abnormality of the network is caused by the certain terminal or the terminals of the certain type; if the OAM determines, according to the MDT data measured by all the terminals or by terminals whose quantity is greater than a certain set proportion, that the current operating status of the network is abnormal, it may be determined that the abnormality of the network is caused by the network itself.

Figure 12:
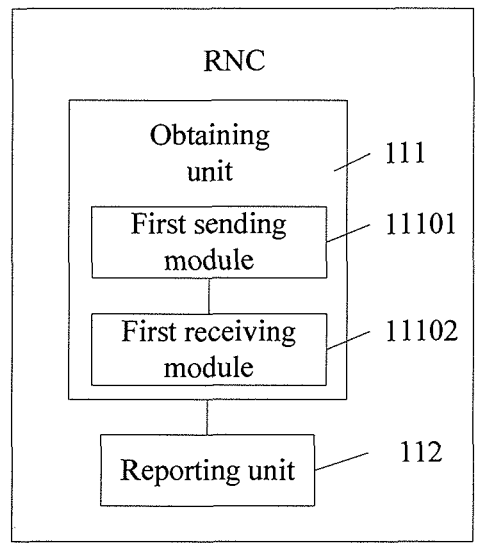
FIG. 12 is a structural diagram of an obtaining unit in an RNC according to an embodiment of the present invention.

Optionally, as shown in FIG. 12, the network element is an RNC. The obtaining unit 111 includes a first sending module 11101 and a first receiving module 11102.

The first sending module 11101 is configured to send, to the terminal, an MDT configuration message carrying indication information for instructing the terminal to report the identity, so as to instruct the terminal to report the MDT data measured by the terminal and the identity of the terminal to the RNC.

The MDT configuration message is a log configuration message or a measurement control message or a terminal information request message.

The first receiving module 11102 is configured to receive the MDT data measured by the terminal and the identity of the terminal that are reported by the terminal.

The first sending module 11101 is specifically configured to send, to the terminal, the log configuration message carrying the indication information for instructing the terminal to report the identity, so as to instruct the terminal to execute MDT measurement; and is further configured to send the terminal information request message to the terminal, so as to trigger the terminal to report the MDT data measured by the terminal and the identity of the terminal to the RNC.

Alternatively, the first sending module 11101 is specifically configured to send a log configuration message to the terminal, so as to instruct the terminal to execute MDT measurement; and is further configured to send, to the terminal, the terminal information request message carrying the indication information for instructing the terminal to report the identity, so as to trigger the terminal to report the MDT data measured by the terminal and the identity of the terminal to the RNC.

The first receiving module 11102 is specifically configured to receive a terminal information response message carrying the MDT data measured by the terminal and the identity of the terminal that are reported by the terminal.

The first sending module 11101 is specifically configured to send, to the terminal, a measurement control message carrying the indication information for instructing the terminal to report the identity, so as to instruct the terminal to execute MDT measurement and report the MDT data measured by the terminal and the identity of the terminal to the RNC.

The first receiving module 11102 is specifically configured to receive a measurement report message carrying the MDT data measured by the terminal and the identity of the terminal that are reported by the terminal.

Figure 13:
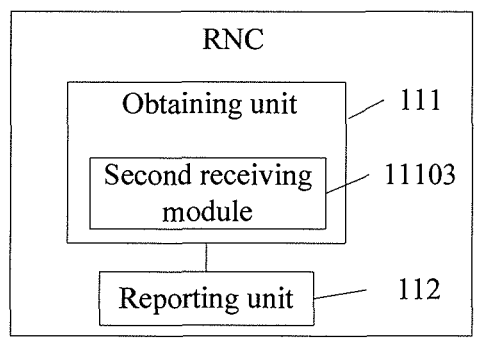
FIG. 13 is a structural diagram of an obtaining unit in another RNC according to an embodiment of the present invention.

Optionally, as shown in FIG. 13, the network element is an RNC. The obtaining unit 111 includes a second receiving module 11103.

The second receiving module 11103 is configured to receive the identity of the terminal that is reported by the terminal by using a dedicated radio resource control RRC message, or is configured to receive a public identity message sent by a core network node CN, where the public identity message includes the identity of the terminal.

The second receiving module 11103 is further configured to receive the MDT data measured by the terminal which is reported by the terminal.

Figure 14:
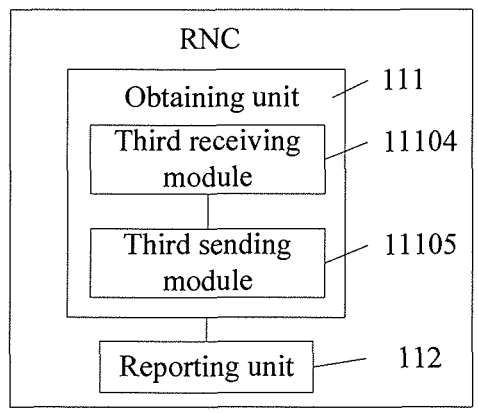
FIG. 14 is a structural diagram of an obtaining unit in another RNC according to an embodiment of the present invention.

Optionally, as shown in FIG. 14, the network element is an RNC. The obtaining unit 111 includes a third receiving module 11104 and a third sending module 11105.

The third receiving module 11104 is configured to receive the MDT data measured by the terminal which is reported by the terminal.

The third sending module 11105 is configured to send an uplink information exchange request message to a CN, where the uplink information exchange request message includes an international mobile subscriber identity IMSI of the terminal.

The third receiving module 11104 is further configured to receive a core network invoke trace message sent by the CN, where the core network invoke trace message includes an identity of the terminal corresponding to the IMSI.

Figure 15:
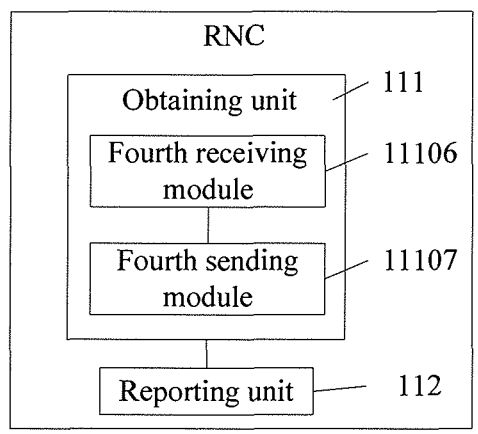
FIG. 15 is a structural diagram of an obtaining unit in another RNC according to an embodiment of the present invention.

Optionally, as shown in FIG. 15, the network element is an RNC. The obtaining unit 111 includes a fourth receiving module 11106 and a fourth sending module 11107.

The fourth receiving module 11106 is configured to receive the MDT data measured by the terminal which is reported by the terminal.

The fourth sending module 11107 is configured to send an uplink information exchange request message to a CN, where the uplink information exchange request message includes an IMSI of the terminal.

The fourth receiving module 11106 is further configured to receive an uplink information exchange response message sent by the CN, where the uplink information exchange response message includes an identity of the terminal corresponding to the IMSI.

Figure 16:
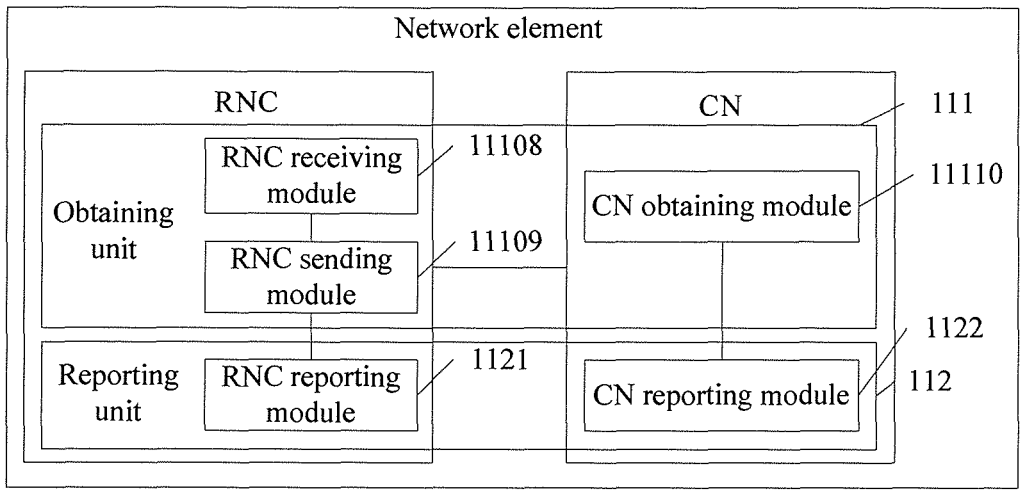
FIG. 16 is a structural diagram of another RNC according to an embodiment of the present invention.

Optionally, as shown in FIG. 16, the network element includes an RNC and a CN. The obtaining unit 111 includes an RNC receiving module 11108, an RNC sending module 11109 and a CN obtaining module 11110. The reporting unit 112 includes an RNC reporting module 1121 and a CN reporting module 1122.

The RNC receiving module 11108 is configured to receive the MDT data measured by the terminal which is reported by the terminal.

The RNC sending module 11109 is configured to send an uplink information exchange request message to the CN, where the uplink information exchange request message includes an IMSI, a TR and a TRSR of the terminal.

The CN obtaining module 11110 is configured to receive the uplink information exchange request message sent by the RNC sending module, and obtain an identity of the terminal corresponding to the IMSI of the terminal.

The RNC reporting module 1121 is configured to report the MDT data measured by the terminal and the TR and the TRSR of the terminal to the OAM.

The CN reporting module 1122 is configured to report the identity of the terminal and the TR and the TRSR of the terminal to the OAM, so that the OAM saves the MDT data measured by the terminal and the identity of the terminal according to the TR and the TRSR of the terminal.

Figure 17:
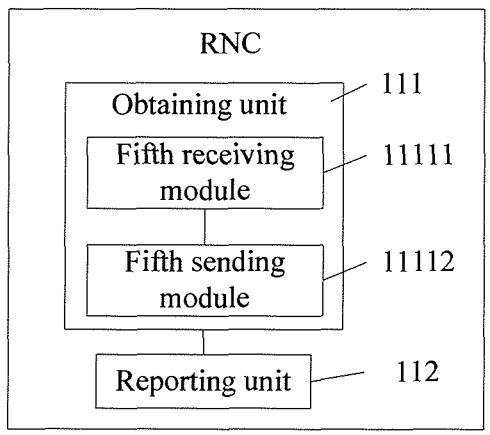
FIG. 17 is a structural diagram of an obtaining unit in another RNC according to an embodiment of the present invention.

Optionally, as shown in FIG. 17, the obtaining unit 111 includes a fifth receiving module 11111 and a fifth sending module 11112.

The fifth receiving module 11111 is configured to receive the identity of the terminal that is reported by the terminal by using a dedicated radio resource control RRC message, or receive the identity of the terminal sent by a CN.

The fifth receiving module 11111 is further configured to receive a trace session activation message sent by the OAM, where the trace session activation message includes a designated TAC.

The fifth sending module 11112 is configured to send an MDT configuration message to a terminal corresponding to the designated TAC, so as to instruct the terminal to execute MDT measurement and report the MDT data measured by the terminal.

The MDT configuration message is a log configuration message or a measurement control message.

The fifth receiving module 11111 is further configured to receive the MDT data measured by the terminal which is reported by the terminal.

Figure 18:
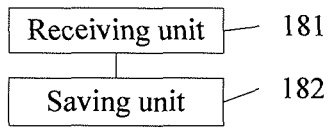
FIG. 18 is a structural diagram of an OAM according to an embodiment of the present invention.

Correspondingly, an embodiment of the present invention further provides an OAM. As shown in FIG. 18, the OAM includes a receiving unit 181 and a saving unit 182.

The receiving unit 181 is configured to receive MDT data measured by a terminal and an identity of the terminal that are reported by a network element.

The saving unit 182 is configured to save the MDT data measured by the terminal and the identity of the terminal.

According to the OAM provided by the embodiment of the present invention, a receiving unit obtains MDT data measured by a terminal and an identity of the terminal, and a saving unit saves the MDT data of the terminal and the identity of the terminal, thereby solving a problem that when determining, according to the MDT data, that a current operating status of a network is abnormal, the OAM cannot accurately determine whether the abnormality of the network is caused by the terminal or the network itself since the MDT data received by the OAM does not include the identity of the terminal. When obtaining the MDT data measured by a plurality of terminals and identities of the plurality of terminals, if the OAM determines, according to the MDT data measured by a certain terminal or terminals of a certain type, that a current operating status of the network is abnormal while determining, according to the MDT data measured by other terminals, that the current operating status of the network is normal, it may be determined that the abnormality of the network is caused by the certain terminal or the terminals of a certain type; if the OAM determines, according to the MDT data measured by all the terminals or by terminals whose quantity is greater than a certain set proportion, that the current operating status of the network is abnormal, it may be determined that the abnormality of the network is caused by the network itself.

Optionally, the receiving unit 181 is specifically configured to receive the MDT data measured by the terminal and a TR and a TRSR of the terminal that are reported by an RNC; and is further configured to receive the identity of the terminal and the TR and the TRSR of the terminal that are reported by a CN.

The saving unit 182 is specifically configured to save the MDT data measured by the terminal and the identity of the terminal according to the TR and the TRSR of the terminal.

Figure 19:
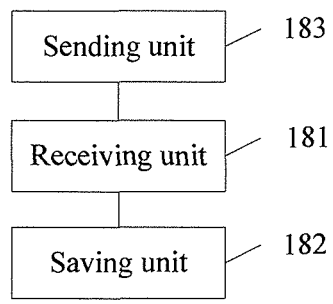
FIG. 19 is a structural diagram of another OAM according to an embodiment of the present invention.

Optionally, as shown in FIG. 19, the OAM further includes a sending unit 182, configured to send a trace session activation message to the RNC, where the trace session activation message includes a designated TAC, so as to instruct the RNC to send an MDT configuration message to a terminal corresponding to the designated TAC.

The CN in the foregoing apparatus may be a serving general packet radio service support node (Serving GPRS Support Node, SGSN) or a mobile switch center (Mobile Switch Center, MSC).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for obtaining terminal minimization of drive-tests (MDT) data by a radio network controller (RNC), the method comprising:
   receiving, by the RNC, MDT data measured by a terminal which is reported by the terminal;
   sending, by the RNC, an uplink information exchange request message to a core network, CN, wherein the uplink information exchange request message comprises an international mobile subscriber identity (IMSI) and a trace reference (TR) and a trace recording session reference (TRSR) of the terminal; and
   reporting, by the RNC, the MDT data measured by the terminal, the TR and the TRSR to an operation, administration and maintenance (OAM).

2. A method for obtaining terminal minimization of drive-tests (MDT) data by an operation, administration and maintenance (OAM), the method comprising:
   receiving, by the OAM, data MDT data measured by a terminal, a trace reference (TR) and a trace recording session reference (TRSR) of the terminal reported by a radio network controller (RNC);
   receiving, by the OAM, an identity of the terminal and the TR and the TRSR of the terminal that are reported by a core network (CN); and
   saving, by the OAM, the MDT data measured by the terminal and the identity of the terminal according to the TR and the TRSR of the terminal.

3. The method according to claim 2, wherein the identity of the terminal is at least one of an international mobile station equipment identity (IMEI), an international mobile station equipment identity and software version number (IMEISV), and a type allocation code (TAC).

4. A method for obtaining terminal minimization of drive-tests (MDT) data by a core network (CN), the method comprising:
   receiving, by the CN, an uplink information exchange request message from a radio network controller (RNC) wherein the uplink information exchange request message comprises an international mobile subscriber identity (IMSI), a trace reference (TR) and a trace recording session reference (TRSR) of a terminal;
   obtaining, by the CN, an identity of the terminal corresponding to the IMSI; and
   reporting, by the CN, the identity of the terminal, the TR and the TRSR to an operation, administration and maintenance (OAM).

5. The method according to claim 4, wherein the identity of the terminal is at least one of an international mobile station equipment identity (IMEI), an international mobile station equipment identity and software version number (IMEISV) and a type allocation code (TAC).

6. A network system, comprising: a radio network controller (RNC) and a core network (CN), wherein:
   the RNC is configured to receive minimization of drive-tests (MDT) data measured by a terminal which is reported by the terminal, send an uplink information exchange request message to the CN, wherein the uplink information exchange request message comprises an international mobile subscriber identity (IMSI), a trace reference (TR) and a trace recording session reference (TRSR) of the terminal, and report the MDT data measured by the terminal and the TR and the TRSR of the terminal to an operation, administration and maintenance (OAM); and
   the CN is configured to receive the uplink information exchange request message sent by the RNC, and obtain the identity of the terminal corresponding to the IMSI of the terminal, and report the identity of the terminal and the TR and the TRSR of the terminal to the OAM.

7. The network system according to claim 6, wherein the identity of the terminal is at least one of an international mobile station equipment identity (IMEI), an international mobile station equipment identity and software version number (IMEISV), and a type allocation code (TAC).

8. The network system according to claim 6, further comprising the OAM, wherein:
   the OAM is configured to:
      receive the MDT data and the TR and TRSR of the terminal from the RNC;
      receive the identity of the terminal and the TR and the TRSR of the terminal from the CN; and
      save the MDT data measured by the terminal and the identity of the terminal according to the TR and the TRSR of the terminal.

9. An operation, administration and maintenance (OAM), wherein:
   the OAM is configured to:
      receive minimization of drive-tests (MDT) data measured by a terminal and a trace reference (TR) and a trace recording session reference (TRSR) of the terminal reported by a radio network controller (RNC);
      receive an identity of the terminal and the TR and the TRSR of the terminal that are reported by a core network (CN); and
      save the MDT data measured by the terminal and the identity of the terminal according to the TR and the TRSR of the terminal.

10. The OAM according to claim 9, wherein the identity of the terminal is at least one of an international mobile station equipment identity (IMEI), an international mobile station equipment identity and software version number (IMEISV), and a type allocation code (TAC).

11. A core network (CN), wherein:
   the CN is configured to receive an uplink information exchange request message from a radio network controller (RNC), wherein the uplink information exchange request message comprises an international mobile subscriber identity (IMSI), a trace reference (TR) and a trace recording session reference (TRSR) of a terminal; and the CN is further configured to obtain an identity of the terminal corresponding to the IMSI; and report the identity of the terminal, the TR and the TRSR to an operation, administration and maintenance (OAM).

12. The CN according to claim 11, wherein the identity of the terminal is at least one of an international mobile station equipment identity (IMEI), an international mobile station equipment identity and software version number (IMEISV) and a type allocation code (TAC).

13. A radio network controller (RNC), wherein:
the RNC is configured to:
receive minimization of drive-tests (MDT) data measured by a terminal which is reported by the terminal; and
send an uplink information exchange request message to a core network (CN), wherein the uplink information exchange request message comprises an international mobile subscriber identity (IMSI) and a trace reference (TR) and a trace recording session reference (TRSR) of the terminal; and report the MDT data measured by the terminal, the TR and the TRSR to an operation, administration and maintenance (OAM).

* * * * *